428-408 SR
2/28/84 XR 4,434,206

United States Patent [19]
Fukuda et al.
[11] 4,434,206
[45] Feb. 28, 1984

[54] SHAPED ARTICLES OF POROUS CARBON FIBERS

[75] Inventors: Hiroyuki Fukuda; Hisatsugu Kaji, both of Iwaki; Hiroto Fujimaki, Kokubunji, all of Japan

[73] Assignee: Kureha Kagaku Kogyo Kabushiki Kaisha, Tokyo, Japan

[21] Appl. No.: 358,373

[22] Filed: Mar. 15, 1982

[30] Foreign Application Priority Data

Apr. 1, 1981 [JP] Japan ..... 56-48700

[51] Int. Cl.[3] ..... B32B 9/00; D04H 1/58
[52] U.S. Cl. ..... 428/288; 264/29.1; 264/29.2; 428/304.4; 428/317.9; 428/408; 428/902

[58] Field of Search ..... 428/288, 304.4, 317.9, 428/408, 902; 264/29.1, 29.2

[56] References Cited

U.S. PATENT DOCUMENTS 4,118,532 10/1978 Homsy ..... 428/902

*Primary Examiner*—Marion McCamish

[57] ABSTRACT

Disclosed herein are shaped articles of porous carbon comprising carbon fibers having a compression strength of higher than 50 kg/cm$^2$ and a porosity of 50 to 80%, in which radii of not less than 60% of the pores are distributed in a range wherein the difference between the upper pore radius and the lower pore radius is 20 microns.

10 Claims, 3 Drawing Figures

SHAPED ARTICLES OF POROUS CARBON FIBERS

BACKGROUND OF THE INVENTION

The present invention relates to shaped articles of porous carbon comprising carbon fibers and a process for manufacturing the same. More in detail, the present invention relates to shaped articles of porous carbon of a large porosity, of a sharp distribution of pore radius thereof and of an excellent mechanical strength, and a process for manufacturing the same.

The shaped articles of porous carbon comprising carbon fibers have come to be regarded recently as more and more important in the fields of filter materials, base plates for electrodes in fuel cells and the likes. Particularly in the field of electrode substrate in fuel cells, shaped articles of porous carbon excellent in electroconductivity, chemical stability and mechanical strength with a large porosity and a sharp distribution of pore diameters thereof are required.

The shaped articles of porous carbon comprising carbon fibers are manufactured by the following various processes. As one of the processes, U.S. Pat. No. 3,829,327 discloses a process in which the web of carbon fibers is covered by chemical vapor deposition with carbon produced by thermal cracking of hydrocarbon. The paper of carbon fibers manufactured by the process of U.S. Pat. No. 3,829,327 is excellent in chemical stability, gas-permeability and electroconductivity, however, it is not economical in order to include the expensive step of chemical vapor deposition, and it has a demerit that the larger the porosity, the smaller the mechanical strength thereof. Another process for manufacturing sheet-likely shaped articles of porous carbon comprises adding an alcohol of boiling point of higher than 150° C. as a binder to pitch fibers for manufacturing mats of pitch fibers and treating the mat of pitch fibers for carbonization in a non-oxidative atmosphere (refer to U.S. Pat. No. 3,960,601). According to the process of U.S. Pat. No. 3,960,601, although sheet-likely shaped articles of porous carbon excellent in electroconductivity with a large porosity are available, their mechanical strength is not necessarily excellent.

As a still another process, U.S. Pat. No. 3,960,601 also discloses the web of carbon fiber obtainable by infusibilizing and then carbonizing the webs comprising pitch fibers prepared by blow-spinning of a pitch. Although sheets of porous carbon excellent in electroconductivity are available by this process, there is a demerit that the porosity is larger, the lower the mechanical strength.

The other demerit in the processes is the difficulty of controlling the distribution of pore radii of porous carbon material of shaped articles, which results, for instance, in the frequent occurrence of irregular diffusion of gas on the surface of an electrode made of the shaped article of porous carbon for a fuel cell leading to the reduction of efficiency of generation of electric power.

The object of the present invention is to provide shaped articles of porous carbon not showing the demerits, which are large in porosity, sharp in pore size-distribution and excellent in electroconductivity and mechanical strength. Another object of the present invention is to provide a process for producing the shaped articles of porous carbon.

SUMMARY OF THE INVENTION

In first aspect of the present invention, there is provided shaped articles of porous carbon comprising carbon fibers having a compression strength of larger than 50 kg/cm$^2$, of a porosity of 50 to 80%, in which radii of not less than 60% of the pores of shaped articles of porous carbon distributed in a range wherein the difference between the upper radius of pores and the lower radius of pores is 20 microns.

In second aspect of the present invention, there is provided a process for producing shaped articles of porous carbon composed of carbon fibers, comprising the steps of adding to 100 parts by weight of a mixture consisting essentially of 100 parts by weight of short carbonaceous fibers and 20 to 100 parts by weight of a resinous binder, 20 to 100 parts by weight of a granular substance which the radii of granules of not less than 70% by weight of granular substance are distributed in a range wherein the difference between the upper radius of the granules and the lower radius of the granules is 30 microns and which is soluble in a solvent, shaping the thus mixed materials at an elevated temperature under a pressure, immersing the thus shaped material into the solvent which is able to dissolve the granular substance to remove the granular substance, and baking the remaining material.

DETAILED DESCRIPTION OF THE INVENTION

Figure 1:
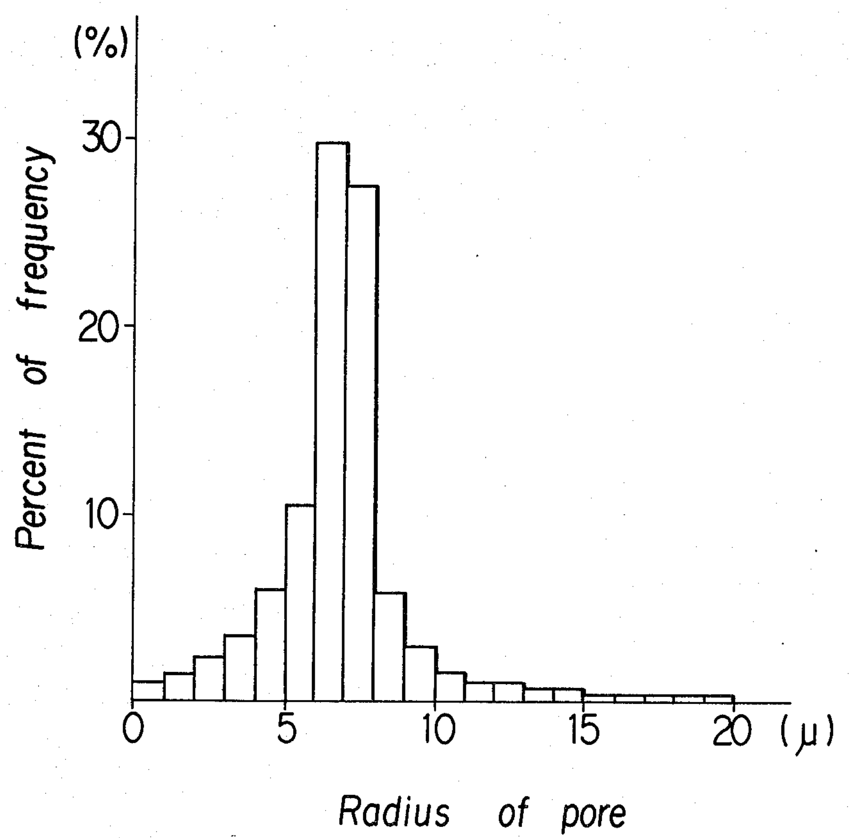
FIG. 1 shows the histogram of distribution of pore radius of the shaped article of porous carbon obtained in Example 1.
Figure 2:
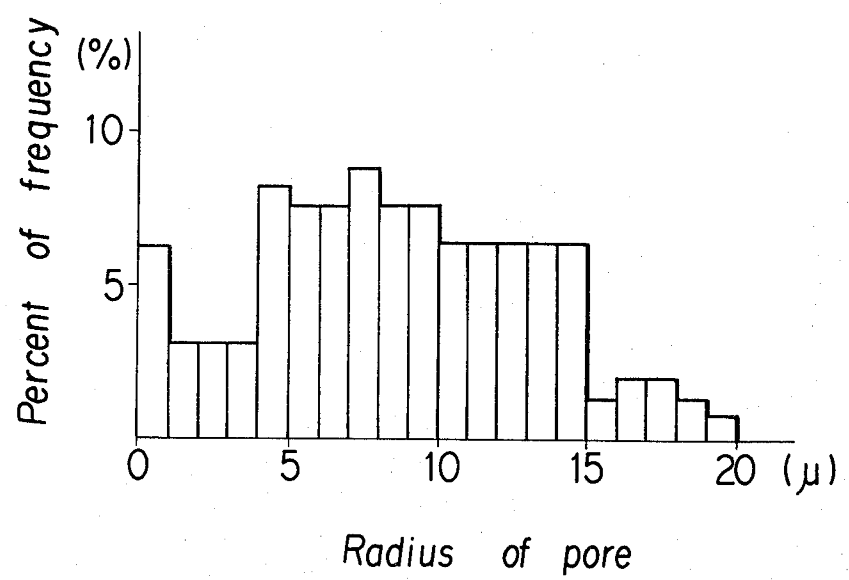
FIG. 2 shows a histogram of distribution of pore radius of a shaped article comprising carbon fibers and a phenol resin other than those according to the present invention and FIG. 3 shows the histogram of distribution of pore radius of the shaped article of porous carbon obtained in Example 2.

The shaped articles of porous carbon obtained according to the present invention have continued pores and the porosity of the porous carbon is 50 to 85% with the compression strength of higher than 50 kg/cm$^2$. The pore radius of the shaped articles of porous carbon of the present invention can be optionally selected in a range of 3 to 150 microns in accordance with the object of the desired shaped articles of porous carbon, and the distribution of the pore radius is very sharp, in other words, the radii of not less than 60% of the pores are distributed in a range wherein the difference between the upper pore radius and the lower pore radius is 20 microns, for instance, 10 to 30 microns or 30 to 50 microns, and, in the case of particularly small average pore radii, a narrower range of 5 to 10 microns in the histogram showing the frequency distribution of pore radius. These properties contribute to the extremely excellent secondary specific properties of the present shaped articles as compared to the conventional shaped articles of porous carbon.

For reference, the term "porosity" is shown by the Japanese Industrial Standards (JIS) Z-2506/1979, and the compression strength at break of the shaped articles of porous carbon is determined by following the method in the Japanese Industrial Standards (JIS) R-

7212/1961 while using specimens of the dimensions of 10×10×5 mm. In addition, the determination of the distribution of pore radius was carried out by a mercury porosimeter (made by Carlo Erba Strumentazione, Italia).

The shaped articles of porous carbon having the specific properties are obtained by a process according to the present invention. Namely, the mixture consisting essentially of short carbonaceous fibers and a resinous binder is admixed with a granular substance soluble in a solvent and after shaping the thus prepared admixture at an elevated temperature under a pressure, the shaped admixture is immersed into the solvent to eluate the granular substance and the remainder is then baked into the shaped articles of porous carbon, the short carbonaceous fibers being converted into short carbon fibers during the baking.

The short carbonaceous fibers for use in manufacturing the product of the present invention are carbonaceous fibers of 3 to 30 microns in diameter cut into the length of shorter than 2 mm. In the case where the cut length is over 2 mm, the fibers get twisted mutually in the steps until shaping to be wool ball-like state and it is impossible to obtain the desired porosity and the distribution of pore radii of the product.

As a precursor of carbonaceous fibers, pitch, polyacrylonitrile, rayon and the like can be used.

The resinous binder for use in the present invention is phenol resin, furfuryl alcohol resin and the like which act as a carbonaceous binder between carbon fibers after carbonization thereof. The amount of the resinous binder mixed with the carbonaceous fibers is 20 to 100 parts by weight per 100 parts by weight of the short carbonaceous fibers. In the case where the amount of the resinous binder is less than 20 parts by weight per 100 parts by weight of the short carbonaceous fibers, the carbonaceous fibers cannot be completely fixed during shaping owing to the shortage of the resinous binder, and on the other hand, in the case where the amount of the resinous binder is more than 100 parts by weight per 100 parts by weight of the carbonaceous fibers, since the surface of the granular substance is covered with the resinous binder, the elution of the granular substance with the solvent becomes incomplete to hinder the availability of the desired diameter of the continued pores and the desired porosity of the product.

The porosity and the properties of pores of the shaped articles of porous carbon according to the present invention depend upon the granular substance soluble in a solvent, and in the present invention, in order to adjust the porosity and the pore radius of the product, the granular substance of a predetermined particle size-distribution is added to the mixture of the short carbonaceous fibers and the resinous binder.

The predetermined particle size-distribution of the granular substance is the frequency distribution of the representative radius of the particles of the granular substance, in which more than 70% by weight of the granular substance have the representative particle radius in a range wherein the difference of the upper representative radius and the lower representative radius of the particles of the granular substance is 30 microns.

The granular substance may be inorganic or organic in nature as far as it is solid at the temperature of shaping and soluble in a suitable solvent. Table 1 shows the organic granular substances used in the process of the present invention.

As the solvent for dissolving the granular substance after shaping, any liquid substance can be used, however, a suitable solvent is selected from those shown in Table 1 in accordance with the kinds of the granular substance used.

TABLE 1

| Organic granular substances and Solvents therefor | |
|---|---|
| Granular substance | Solvent |
| Polyvinyl alcohol | water and dimethylformamide |
| Polyvinyl chloride | tetrahydrofuran and methyl ethyl ketone |
| Polystyrene | benzene, toluene, tetrahydrofuran and methyl ethyl ketone |
| Polymethyl methacrylate | benzene, toluene, chloroform and acetone |
| Sucrose | water |
| Soluble starch | water |

The radius of the granular substance is selected in accordance with the desired pore radius of the shaped articles of porous carbon according to the present invention, for instance, as shown in Table 2, however, naturally not restricted within the range shown in Table 2.

TABLE2

| | | Unit: Microns |
|---|---|---|
| Range of pore radius of shaped article[1] | Range of radius of granular substance[2] | Range of radius of granular substance[3] |
| 5 to 10 | 10 to 50 | 20 to 40 |
| 10 to 30 | 30 to 70 | 40 to 60 |
| 30 to 50 | 40 to 100 | 60 to 80 |

Notes:
[1]At least 60% by weight of the shaped article has pore radius in the range.
[2]All of the particles of the granular substance have the radius shown in the range.
[3]At least 70% by weight of the particles of granular substance has the radius in the range.

Actually, for instance, in the case where the shaped articles of porous carbon in which the radii of not less than 60% by weight of the pores are distributed in the range of 5 to 10 microns are to be prepared, the granular substance is selected among those which have the representative radius of particle in the range of 10 to 50 microns and at least 70% by weight of which have the representative radius of particle in the range of 20 to 40 microns.

The amount of addition of the granular substance is selected from the range of 20 to 100 parts by weight per 100 parts by weight of the mixture of short carbonaceous fibers and resinous binder in accordance with the desired porosity and pore radius of the shaped articles of porous carbon of the present invention.

The process for manufacturing the shaped articles of porous carbon according to the present invention will be explained concretely more in detail, particularly in the case where pitch is used as the precursor of the carbonaceous fibers as follows.

Oxidized pitch fibers obtained by subjecting the starting material such as pitch fibers, to a treatment for infusibilization are thermally treated in an inert atmosphere at 400° to 800° C. in order to make the fibers strong enough not to be snapped or broken during the shaping, and the thus thermally treated carbonaceous fibers (hereinafter referred to simply as the carbonaceous fibers) are cut into shorter than 2 mm in length.

The thus cut carbonaceous fibers are immersed into a complete solution of a resinous binder such as phenol resin and the like in a solvent such as methanol and the like for 0.5 to 2 hours to form the resinous binder nearly uniformly coated on and adhered to the surface of the carbonaceous fibers. In the case of shorter time of immersion, the amount of the resinous binder adhering onto the surface of the carbonaceous fibers is too small to completely fix the fibers in the step of shaping, and on the other hand, in the case of longer time of immersion than 2 hours although there is no problem in quality of the product, it is not favorable from the view point of productivity.

After immersing the carbonaceous fibers for the predetermined time period, they are collected by filtering and dried for 0.5 to 2 hours at a suitable temperature between 50° and 70° C. The temperature and time period for drying should be suitably selected because the excess temperature and time period cause the melting and solidifying of the resinous binder during the drying.

After drying, the thus formed block is crushed into small pieces and after adding the granular substance of a predetermined particle size distribution to the crushed pieces, the mixture is well blended to be a uniform mixture because of the possible occurrence of irregularity in distribution of the pores on the surface of the shaped articles due to the incomplete mixing of the granular substance and the carbonaceous fibers.

The thus obtained uniformly blended mixture is press-shaped by metal mold pressing or continuous pressing while using rollers at a suitably determined temperature under a suitably determined pressure in accordance with the kinds of the resinous binder, the size of the desired shaped article including the thickness thereof and the shape of the desired shaped article. In the case of shaping at an excessively higher temperature, the granular substance may be denatured according to its kind and becomes not to be easily eluted with solvents. On the other hand, in the case of shaping at an excessively lower temperature, it takes longer period for the shaped article to solidify and such a situation is not favorable in view of productivity. In addition, in the case of shaping under an excessively high pressure, the carbonaceous fibers are snapped and the granular substance is deformed resulting in the difficulty of obtaining the desired porosity and pore diameter of the product. On the other hand, in the case of shaping under an excessively lower pressure, binding due to the resinous binder becomes partly incomplete causing the frequent occurrence of stratified cracks in the shaped articles.

After shaping, the shaped product was subjected to after-hardening treatment for 0.5 to 2 hours corresponding to the thickness of the finished articles of 1 mm, and after the treatment of after-hardening, the shaped product is immersed into a solvent which is able to dissolve the granular substance for 0.5 to 4 hours to elute the granular substance from the shaped product. In the case of using organic granular substance, the substance remaining in the shaped product is carbonized in the step of baking at a high temperature even if the granular substance is not completely eluted out, and accordingly, there is no fear of introducing impurities into the shaped article of porous carbon, however, in the case of incomplete elution of the granular substance from the shaped product, irrespective of its organic or inorganic nature, the shape or form of the pores of the shaped article after baking becomes complicated resulting in the reduction of diffusive capability of the shaped articles. Accordingly, in order to make the elution complete, the sufficiently long time period is favorable for elution, however, too long time period results in the reduction of productivity.

The shaped product from which the granular substance has been eluted out is dried under a load of 0.05 to 1 kg/cm$^2$ not to be deformed.

After drying, the dried product is baked to be carbonized at 800° to 1200° C. In this step of baking, the carbonaceous fibers having a surface activity and the resinous binder are adhered to each other with a good compatibility resulting in the strong binding structure resulting in a strong binding between the carbon fibers via the carbonized resinous binder. The thus baked article is further baked in accordance with the necessity at 1800° to 2400° C.

The present invention will be explained more concretely while referring to non-limitative examples.

EXAMPLE 1

Carbonaceous fibers of average diameter of 12 microns which had been prepared from pitch and subjected to thermal treatment at 600° C. were cut into shorter than 2 mm in length and immersed into a solution of 45 parts by weight of a phenol resin in 100 parts by weight of methanol for one hour, and then collected by filtration to be dried for 3 hours at 60° to 70° C. The amount of the phenol resin adhering to the surface of the carbonaceous fibers was 30 parts by weight per 100 parts by weight of the carbonaceous fibers.

The thus prepared material was crushed into pieces, and 67 parts by weight of particles of polyvinyl alcohol of 10 to 50 microns in particle radius (about 70% by weight of the particles had radius in a range of 20 to 40 microns) was added to 100 parts by weight of the thus crushed pieces and the mixture was uniformly blended. The thus uniformly blended mixture was introduced into metal molds and press-shaped under a pressure of 70 kg/cm$^2$ and at a temperature of 140° C., and then kept in a furnace at 140° C. for 4 hours to harden the phenol resin.

The thus obtained shaped articles were immersed into a warm water at 70° C. for about 4 hours to elute more than 50% by weight of polyvinyl alcohol in the shaped articles by the warm water. Then, the shaped articles were dried at 140° C. under a load of 0.1 kg/cm$^2$. The thus dried articles were baked two times at first at 1000° C. and then at 2000° C.

The thus obtained final product, the shaped articles of porous carbon showed a porosity of 68%, a compression strength at break of 100 kg/cm$^2$ and a volume specific resistance of $9\times10^{-3}$ ohm.cm (within a plane).

FIG. 1 is the histogram of pore radius of the pores of the thus manufactured shaped article, and as is seen in FIG. 1, more than 75% of the pores had radii in the range of 5 to 10 microns which was a very sharp distribution of the pore radius that had never been obtained before. The hitherto obtained shaped article of porous carbon was not the present invention, which showed about 70% of porosity showed a compression strength at break of far inferior to that of the shaped article of porous carbon obtained in Example 1.

For comparison, the histogram of pore radius of the pores of the shaped article manufactured from the mixture of the carbonaceous fibers made and treated as in the same manner as in Example 1 and the same phenol resin as in Example 1, however, not containing polyvinyl alcohol as the granular substance is shown in FIG.

2. In the thus manufactured shaped article, about 35% of the total pores had pore radius in the range of 5 to 10 microns, in another words, the shaped article had a broader distribution of pore radius. In addition, the porosity of the shaped article was calculated to be about 25%, which showed that the shaped article manufactured while not using the granular substrace was not the porous carbon article of the object of the present invention.

Further, the shaped article manufactured by mixing the carbonaceous fibers and a phenol resin as the binder at another weight ratio than that shown above, however, without adding polyvinyl alcohol as the granular substance showed a porosity of about 70% but the thus manufactured shaped article was too brittle to determine the compression strength at break.

EXAMPLE 2

Into 100 parts by weight of crushed mixture of the carbonaceous fibers and the phenol resin obtained as in Example 1, 60 parts by weight of particles of granular sucrose sifted in advance to have radius of particle in a range of 30 to 70 microns was added and the mixture was uniformly blended. The thus uniformly blended mixture was introduced into metal molds and press-shaped at a temperature of 140° C. under a pressure of 70 kg/cm$^2$ and then kept in a furnace at 140° C. for 4 hours to make the phenol resin fully hardened. The thus shaped articles were immersed in a warm water at 80° C. for about 4 hours to elute about 60% by weight of sucrose in the shaped articles. The thus treated shaped articles were dried at 140° C. under a load of 0.1 kg/cm$^2$ and then baked two times, at first at 1000° C. and then at 2000° C.

Figure 3:
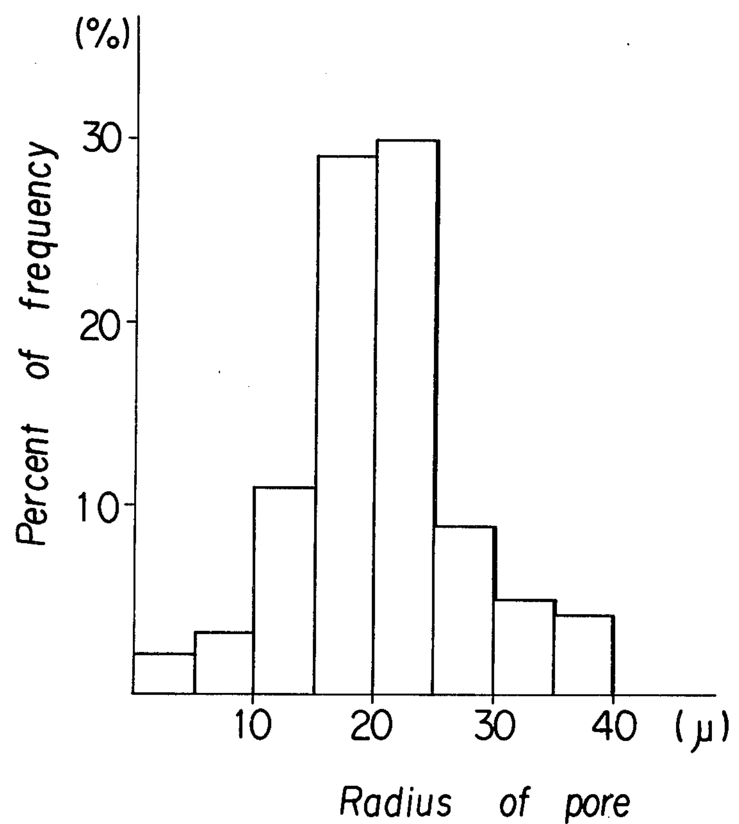

The thus manufactured shaped articles of porous carbon showed a porosity of 65%, a compression strength at break of 110 kg/cm$^2$ and a volume specific resistance of $9\times10^{-3}$ ohm.cm (within the surface). FIG. 3 is the histogram of the pore radius of the pores of the thus manufactured shaped articles of porous carbon. As is seen in FIG. 3, in the thus manufactured shaped articles, more than 70% of all the pores had pore radius in the range of 10 to 30 microns, in other words, the shaped articles showed a sharp distribution of pore radius thereof.

What is claimed is:

1. A shaped article comprised of porous carbon having a porosity of 50 to 85% and a compressive strength of more than 50 kg/cm$^2$ wherein the radii of not less than 60% of the total number of the pores of said shaped article are distributed in a range wherein the differences between the upper limit of the pore radius and the lower limit of the pore radius is not more than 20 microns, said shaped articles being prepared by:

(a) preparing lumps of a mixture of 100 parts by weight of carbonaceous fibers of 3 to 30 microns in diameter and less than 2 mm in length and 20 to 100 parts by weight of a resinous binder selected from the group consisting of phenolic resins and furfuryl alcohol resins;

(b) crushing the thus prepared mixture;

(c) adding to 100 parts by weight of the resultant crushed mixture 20 to 100 parts by weight of a granular substance which is soluble in a solvent, and wherein the radii of the particles occupying more than 70% of the weight of said granular substance are distributed in a range wherein the difference between the upper limit of the radius thereof and the lower limit of the radius thereof is not more than 30 microns;

(d) shaping the thus obtained mixture at an elevated temperature and under pressure;

(e) immersing the thus shaped mixture into a solvent which is capable of dissolving said granular substance, thereby removing said granular substance from the shaped mixture; and (f) baking the thus treated mixture at an elevated temperature, thereby obtaining said shaped articles of porous carbon.

2. The shaped article of porous carbon according to claim 1, wherein said radii of the pores of said shaped article occupying more than 60% of the total number of the pores thereof are distributed in a range of 5 to 10 microns, and wherein the radii of the particles occupying at least 70% of the weight of the particles of said granular substance are distributed in a range of 20 to 40 microns.

3. The shaped article of porous carbon according to claim 1, wherein said radii of the pores thereof occupying more than 60% of the total number of the pores of said shaped article are distributed in a range of 10 to 30 microns, and wherein the radii of the particles occupying at least 70% of the weight of the particles of said granular substance are distributed in a range of 40 to 60 microns.

4. The shaped article of porous carbon according to claim 1, wherein said radii of the pores thereof occupying more than 60% of the total number of the pores of said shaped article are distributed in a range of 30 to 50 microns, and wherein the radii of the particles occupying at least 70% of the weight of the particles of said granular substance are distributed in a range of 60 to 80 microns.

5. A process for producing shaped articles of porous carbon having carbon fibers as the base material, comprising the steps of:

(a) preparing the lumps of a mixture of 100 parts by weight of carbonaceous fibers of 3 to 30 microns in diameter and less than 2 mm in length, and 20 to 100 parts by weight of a resinous binder selected from the group consisting of phenolic resins and furfuryl alcohol resins;

(b) crushing the thus prepared mixture;

(c) adding to 100 parts by weight of the resultant crushed mixture, 20 to 100 parts by weight of a granular substance which is soluble in a solvent, and wherein the radii of the particles occupying more than 70% of the weight of said granular substance are distributed in a range wherein the difference between the upper limit of the radius thereof and the lower limit of the radius thereof is not more than 30 microns;

(d) shaping the thus obtained mixture at an elevated temperature and under pressure;

(e) immersing the thus shaped mixture into said solvent to dissolve said granular substance, thereby removing said granular substance from the shaped mixture; and (f) baking the thus treated shaped mixture at an elevated temperature, thereby converting said carbonaceous fibers into carbon fibers within said shaped mixture, to provide said shaped articles of porous carbon having carbon fibers.

6. The process according to claim 5, wherein said carbonaceous fibers are obtained by heat-treating oxidized pitch fibers in an inert gaseous atmosphere at a temperature of 400° to 800° C.

7. The process according to claim 5, wherein said granular substance is an organic substance selected from the group consisting of polyvinyl alcohol, polyvinyl chloride, polystyrene, polymethyl methacrylate, sucrose and soluble starch.

8. The process according to claim 5, wherein the radii of the particles of said granular substance are in a range of 10 to 50 microns, and the radii of the particles occupying at least 70% of the weight of said granular substance are in the range of 20 to 40 microns.

9. The process according to claim 5, wherein the radii of said granular substance are in a range of 30 to 70 microns and the radii of the particles occupying at least 70% of the weight of said granular substance are in a range of 40 to 60 microns.

10. The process according to claim 5, wherein the radii of said granular substance are in a range of 40 to 100 microns and the radii of the particles occupying at least 70% of the weight of said granular substance are in the range of 60 to 80 microns.

* * * * *